United States Patent
Krompass et al.

(10) Patent No.: US 9,928,742 B2
(45) Date of Patent: Mar. 27, 2018

(54) METHOD AND SYSTEM FOR GENERATING TRAFFIC INFORMATION FOR AT LEAST ONE VEHICLE

(71) Applicant: Bayerische Motoren Werke Aktiengesellschaft, Munich (DE)

(72) Inventors: Stefan Krompass, Neufahrn (DE); Stefan Wiebel, Munich (DE); Stephan Voigt, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 239 days.

(21) Appl. No.: 14/743,341

(22) Filed: Jun. 18, 2015

(65) Prior Publication Data
US 2015/0287321 A1    Oct. 8, 2015

Related U.S. Application Data

(63) Continuation of application No. PCT/EP2013/076357, filed on Dec. 12, 2013.

(30) Foreign Application Priority Data

Dec. 19, 2012  (DE) .................. 10 2012 223 780

(51) Int. Cl.
*G08G 1/0967* (2006.01)
*G08G 1/09* (2006.01)
(Continued)

(52) U.S. Cl.
CPC ........... *G08G 1/0967* (2013.01); *G01C 21/26* (2013.01); *G08G 1/092* (2013.01); *G08G 1/093* (2013.01);
(Continued)

(58) Field of Classification Search
None
See application file for complete search history.

(56) References Cited

U.S. PATENT DOCUMENTS 6,154,152 A * 11/2000 Ito ..................... G01C 21/32
                                              340/988
6,199,011 B1 * 3/2001 Matsuda ............. G01C 21/26
                                              340/988
(Continued)

FOREIGN PATENT DOCUMENTS

DE     195 03 416 A1    8/1996
DE     197 39 257 A1    3/1999
(Continued)

OTHER PUBLICATIONS

International Search Report (PCT/ISA/210) dated Jul. 2, 2014 with English translation (five pages).
(Continued)

*Primary Examiner* — Jerrah Edwards
*Assistant Examiner* — Donald J Wallace
(74) *Attorney, Agent, or Firm* — Crowell & Moring LLP

(57) ABSTRACT

A method is provided for generating traffic information for at least one vehicle, the information including at least one position. The method includes the following acts: comparing a currently used position table to at least one further position table; determining deviations in entries in the position tables; and, if a deviation is present, using the position of the deviating entry in one of the position tables as a reference point for the traffic information to be generated. A system for generating traffic information is described.

15 Claims, 7 Drawing Sheets

(51) Int. Cl.
*G01C 21/26* (2006.01)
*H04H 20/55* (2008.01)

(52) U.S. Cl.
CPC . *G08G 1/096741* (2013.01); *G08G 1/096775* (2013.01); *H04H 20/55* (2013.01)

(56) References Cited

U.S. PATENT DOCUMENTS

| | | | |
|---|---|---|---|
| 6,292,745 B1* | 9/2001 | Robare | G06F 17/30241 340/988 |
| 6,324,466 B1 | 11/2001 | Vieweg et al. | |
| 6,434,477 B1 | 8/2002 | Goss et al. | |
| 6,741,932 B1 | 5/2004 | Groth et al. | |
| 6,990,407 B1* | 1/2006 | Mbekeani | G08G 1/0104 340/995.13 |
| 2001/0028314 A1 | 10/2001 | Hessing et al. | |
| 2005/0102098 A1* | 5/2005 | Montealegre | G01C 21/3484 701/533 |
| 2005/0187708 A1* | 8/2005 | Joe | G08G 1/092 701/431 |
| 2006/0241858 A1* | 10/2006 | Adachi | G08G 1/0969 701/408 |
| 2006/0293845 A1* | 12/2006 | Watanabe | G01C 21/32 701/450 |
| 2007/0038363 A1 | 2/2007 | McGrath | |
| 2008/0201072 A1* | 8/2008 | Adachi | G01C 21/30 701/533 |
| 2009/0171558 A1* | 7/2009 | Davis | G01C 21/32 701/532 |
| 2009/0228193 A1* | 9/2009 | Guerrero | G08G 1/091 701/118 |
| 2009/0287405 A1* | 11/2009 | Liu | G01C 21/20 701/119 |
| 2009/0299618 A1* | 12/2009 | Cornelius | G01C 21/3691 701/532 |
| 2010/0106397 A1* | 4/2010 | Van Essen | G06F 17/30241 701/532 |
| 2012/0065879 A1* | 3/2012 | Adachi | G01C 21/30 701/409 |
| 2012/0150425 A1* | 6/2012 | Chapman | G01C 21/3691 701/119 |
| 2012/0289253 A1* | 11/2012 | Haag | G06Q 50/26 455/456.2 |
| 2013/0030692 A1* | 1/2013 | Hagan | G01C 21/32 701/410 |
| 2013/0117321 A1* | 5/2013 | Fischer | G01C 21/32 707/792 |
| 2013/0117322 A1* | 5/2013 | Fischer | G06F 17/30289 707/792 |

FOREIGN PATENT DOCUMENTS

| | | |
|---|---|---|
| DE | 199 37 372 A1 | 2/2001 |
| DE | 100 15 935 A1 | 10/2001 |
| DE | 10 2004 033 075 A1 | 1/2006 |
| DE | 10 2007 013 561 A1 | 9/2008 |
| WO | WO 2008/038974 A1 | 4/2008 |

OTHER PUBLICATIONS

German Search Report dated Aug. 1, 2013 with partial English translation (10 pages).

* cited by examiner

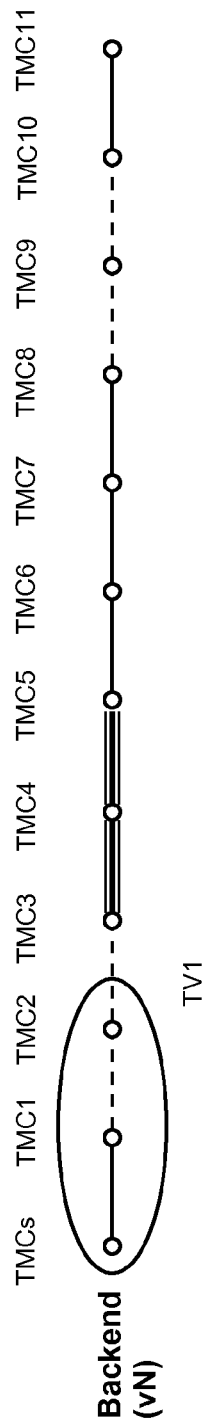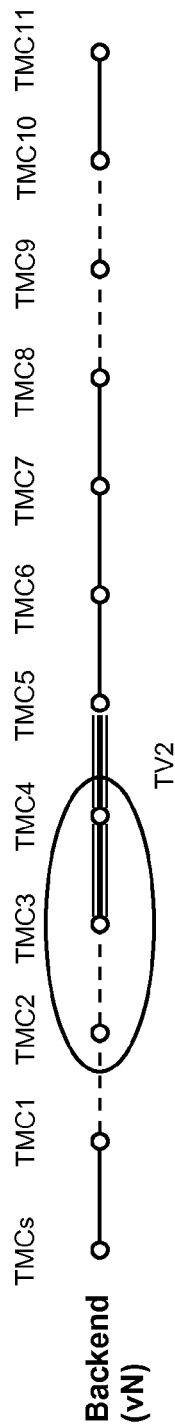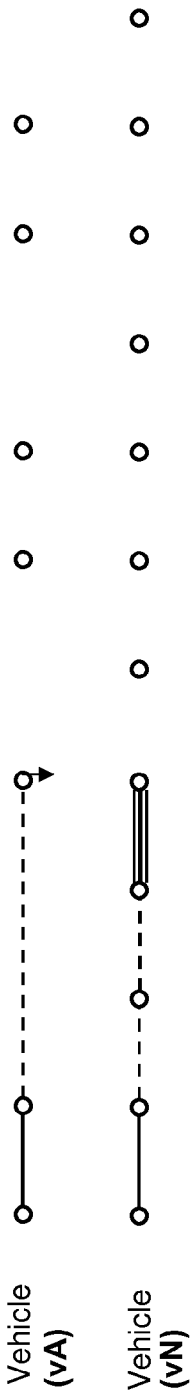
Figure 4
Figure 5

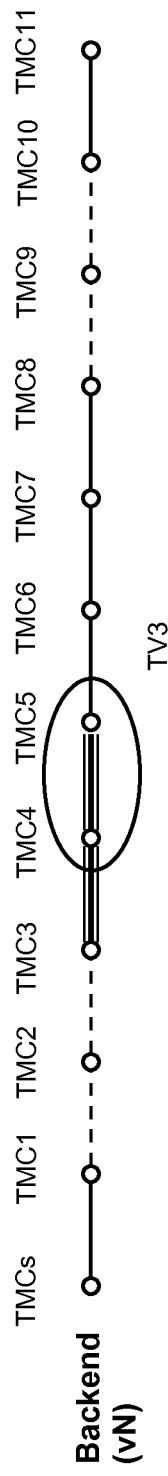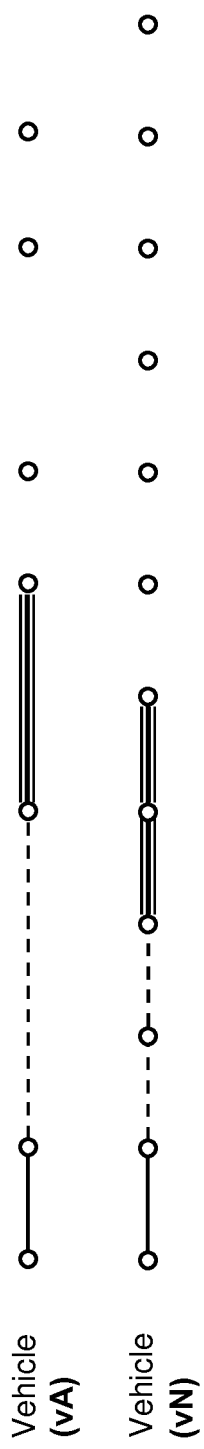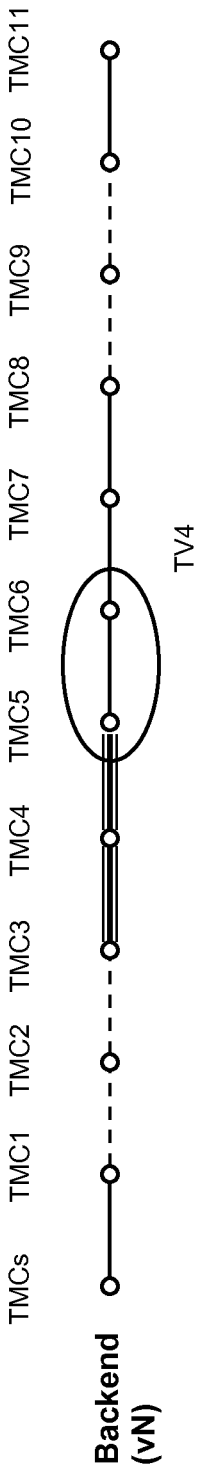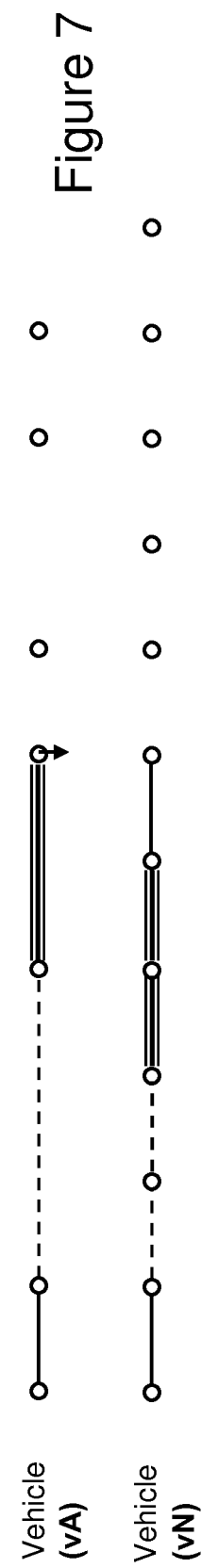

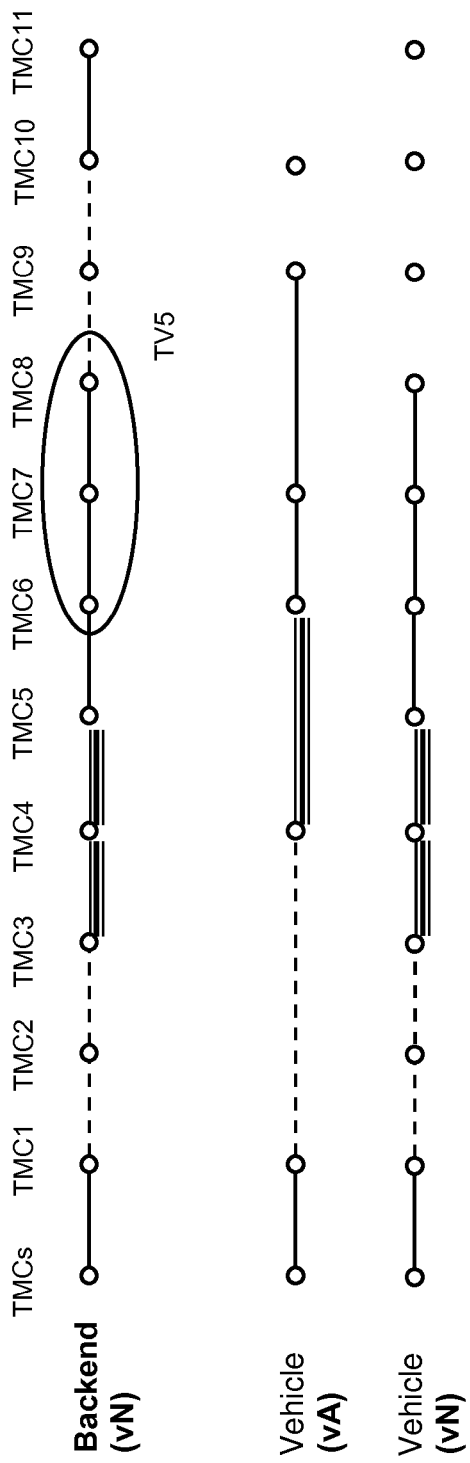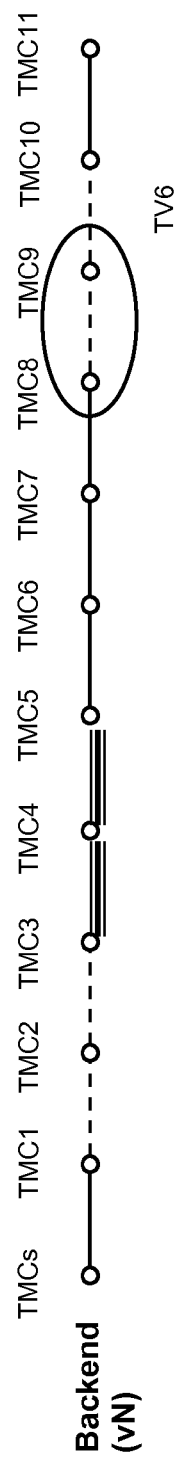

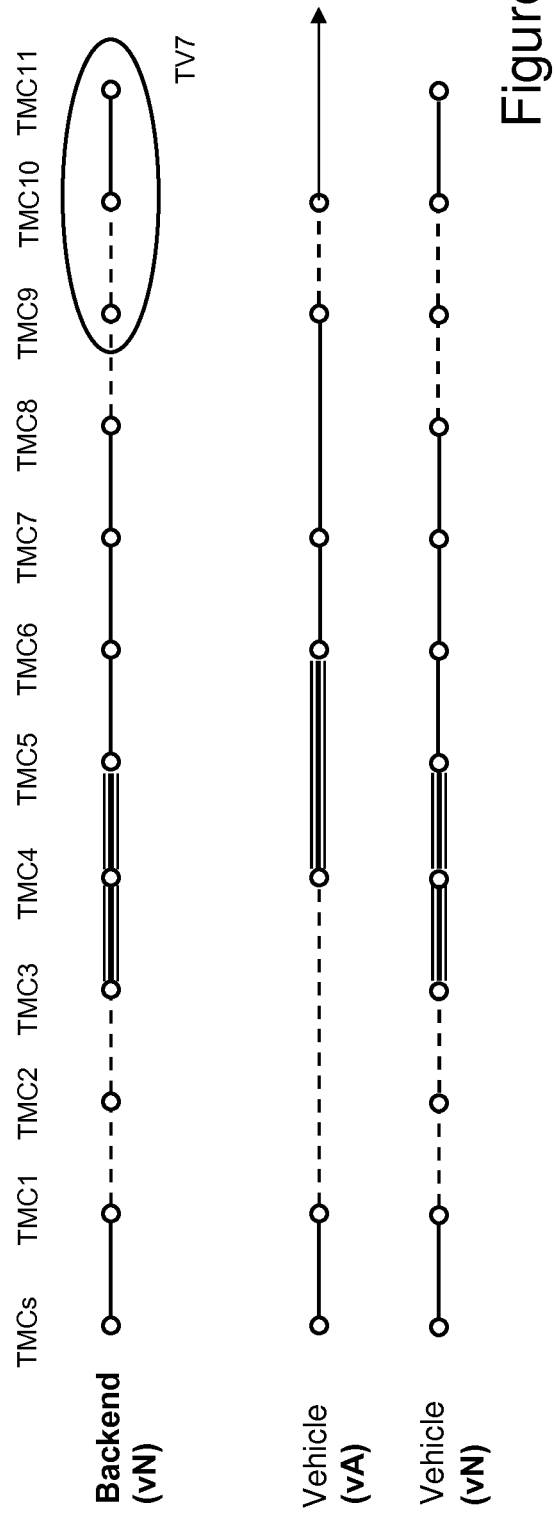

METHOD AND SYSTEM FOR GENERATING TRAFFIC INFORMATION FOR AT LEAST ONE VEHICLE

CROSS REFERENCE TO RELATED APPLICATIONS

This application is a continuation of PCT International Application No. PCT/EP2013/076357, filed Dec. 12, 2013, which claims priority under 35 U.S.C. § 119 from German Patent Application No. 10 2012 223 780.1, filed Dec. 19, 2012, the entire disclosures of which are herein expressly incorporated by reference.

BACKGROUND AND SUMMARY OF THE INVENTION

The invention relates to a method for generating traffic information for at least one vehicle and to a system for generating traffic information for at least one vehicle.

Transmitting coded traffic reports, which are also called traffic information, to vehicles and employing them for calculating routes in a navigation system is known. It is also advantageous to transmit traffic predictions, especially for longer segments. To prevent premature calculation of an alternative route that would not be necessary at all because the current traffic disturbance could be gone by the time the vehicle reaches it, it is also advantageous to transmit traffic predictions that may be used to predict the duration of the disturbance, and thus it is also advantageous to evaluate relevance for the specific route. If it is predicted that traffic disturbance will still be present when the vehicle reaches the location of the traffic disturbance, an alternative route may be considered at that time; however, if it is predicted that the traffic disturbance will be eliminated once the vehicle reaches the location of the traffic disturbance, this special traffic disturbance may be kept out of consideration in the route calculation.

Known protocols for transmitting traffic reports are TMC Alert C and TPEG (Transport Protocol Experts Group) with the application-specific CTT (Congestion and Travel Time) and TFP (Traffic Flow and Prediction). These protocols make it possible to transmit traffic predictions.

The traffic information is coded based on so-called TMC locations. Thus, for instance, TFP vectors, which provide the traffic flow, are coded as "Start at TMC location with a length of n TMC locations." The TMC locations are stored in so-called TMC location tables, which are also called position tables or location tables in the following. The TMC locations are stored in the position tables and current traffic information, which means currently valid and predicted traffic information, is generated using these TMC locations and is rendered especially using the traffic conditions present between the TMC locations. Thus, congestion for the area between two TMC locations may be predicted, while merely increased traffic may be predicted between two other TMC locations.

This traffic information that is to be output in a vehicle, especially in a navigation device of a vehicle, which navigation device is a terminal device of a navigation system, is generated in the central device of the navigation system, the so-called backend, and transmitted to the vehicle. In the vehicle, the traffic information is transmitted and output, especially displayed, using the position table stored in the vehicle. The traffic information is transmitted, output, and displayed using the position table in the vehicle, the entries in the position table, that is, the positions, being positions along a segment section and corresponding to geographic positions that may also be reproduced on a map.

Currently, to be able to display correct traffic information in the vehicle in which the position table and associated map are stored in the navigation device, the vehicle and the backend, that is, the supplier of the traffic information, must work on the same version of the position table. However, this is not always possible, especially due to different versions of position tables.

This causes a variety of errors. For instance, it may happen that the position table in the vehicle is older than the position table in the backend. Or, it may happen that the position table in the backend is older than the position table in the vehicle. Positions, which in the following are also called TMC Locations, may be omitted, or, as occurs much more frequently, new positions, that is, TMC Locations, are added. If the vehicle uses a different position table than the backend, the traffic information is displayed with inadequate quality.

To address this problem, DE 10 2004 033 075 A1, for instance, discloses a method for evaluating traffic information. When it is detected that traffic information cannot be evaluated due to different versions of the TMC location table, an error message is generated and the driver of the vehicle is thus provided the opportunity to check his TMC location table and possibly to implement an updated version.

One drawback of this method is that the driver or other user of a traffic information system must be active and the current problem for the driver or user, that is, that he is not being shown the correct information, is not resolved.

The object of the present invention is therefore to create a solution that permits traffic data to be rendered correctly even when there are different versions of position information in the vehicle and on the backend.

The invention is based on the understanding that this object may be attained in that traffic information is processed based on version differences between versions of the position tables.

In accordance with a first aspect of the invention, the object is attained using a method for generating traffic information for at least one vehicle, which information comprises at least one position. The method is characterized in that the method comprises at least the following steps:

a) Comparing a currently used position table to at least one further position table;

b) Determining deviations in the entries in the position tables; and, c) If a deviation is present, using the position of the deviating entry in one of the position tables as a reference point for the traffic information to be generated.

The method is preferably used in a system in which a vehicle, especially a navigation device allocated to a vehicle, communicates with a central device that is also called a backend. The central device represents an infrastructure of the system and may comprise one or a plurality of computer units.

In the context of the invention, traffic information shall be construed to be information that provides details about the traffic conditions at a geographic position and especially on a segment between two geographic positions. The segment between two geographic positions is also called a section or segment section in the following. This traffic information may be displayed to the driver of a vehicle. The traffic information comprises at least one position. In accordance with the present method, the at least one position is expressed by position data in a position table in which there are entries, especially position data, for individual positions.

The position data are therefore also called position details. Position data for a specific position constitute an entry in the position table. The position details preferably represent so-called traffic message channel (TMC) position data. TMC is a technology that is used to send traffic limitations to vehicles by means of signals, for instance in the inaudible range of the VHF signal, in digital form. The position details are also called position codes, wherein the position codes, which are also called location codes, are allocated to a geographical location using the position table, which is also called a location table.

In accordance with the invention, a currently used position table is compared to at least one further position table. A position table is called a currently used position table when it is used to link position details to traffic data; the traffic data especially represent traffic messages, such as a message about congestion.

In accordance with the invention, the at least one further position table is another version of the currently used position table. In particular, the positional details cover the same geographic area, at least by area, in the position tables, that is, in the currently used position table and the at least one further position table. If a plurality of versions of the position table are available, preferably selected for the further position table that is compared to the currently used position table is the position table that has the oldest generation or update date. In the following, therefore, and provided there is no statement to the contrary, the currently used position table is also called the new version of the position table and the at least one further position table is called the older or oldest version of the position table. The invention is not limited to this combination, however.

In accordance with the invention the currently used position table is compared to at least one further position table, Deviations in the entries included in the position tables are detected. Thus, in particular the difference between the oldest and the new version of the position table may be determined.

The detection of the deviations is inventively used such that the position at which the deviation is detected in at least one of the position tables is used as a reference point during generation of the traffic information. In this context, use as a reference point for generating the traffic information means that, at the positions at which deviations were detected, traffic information is generated differently compared to generation of traffic information at positions at which no deviation was detected. For instance, the traffic data to be linked to the entries are treated differently at these positions.

In this manner it becomes possible not only to obtain information that there may be a deviation between versions of the position tables, but also these detected deviations may be considered when the traffic information is generated and it is thus possible to generate the traffic information with greater precision. In particular, it is possible to generate traffic information independent of version using the inventive method.

In accordance with the invention, the traffic information is preferably determined for a segment course on a geographic map. The segment course is determined by at least two positions. The distance between two positions on a segment course is also called a section. In the following, when reference is made to the "next position," this means the next position along the segment course. Provided there is no indication to the contrary, other references to the situation of the positions relative to one another relate to the positions along a segment course.

Preferably, the deviation of entries represents the absence of an entry of the position in the further position table or the presence of an additional position in the further position table. Different scenarios may be covered in that both the absence of entries from, and the addition of entries to, the position tables is determined during the comparison. In particular, with the inventive method the currently used version may both represent a newer or an older version of the position table. This is advantageous, because as a rule the currently used version of the position table is used at a central location, which is also called a backend. It may happen that a newer or even an older version is used on the backend than the version that is used in a vehicle that communicates with the central device and in which the traffic information is to be output. As a rule, there are fewer entries in the position table in older versions of a position table than in the newer version. When an older version is compared to a newer or more recent version, therefore, the presence of additional entries in the newer version is largely recognized as deviations. In contrast, when comparing a more recent version to an older version, as rule the absence of entries is detected in the older version. However, since as a rule the newest version of the position table is used at the central device, the deviation is preferably the absence of an entry in the position table.

In accordance with one embodiment, the method comprises at least the following step: generating traffic information in the form of a vector using the currently used position table, the position of the at least one deviating entry being used as a reference point for generating at least one sub-vector of the vector.

The additional steps of the inventive method, in particular the comparison of the position tables and the determination of deviations, are also performed in the embodiment of the method.

The accuracy of the traffic information to be generated is increased in that, in this preferred embodiment, the vector that provides the traffic information is generated by sub-vectors, wherein, in at least one of the sub-vectors, the position of the at least one deviating entry acts as a reference point. In conventional methods, the traffic information is indicated for instance as a TFP vector, wherein a start position is selected from the position table and the vector is indicated by the provision of the number of entries in the position table between start position and end position of the vector. Thus, a quantitative indication is undertaken with respect to the entries in the position table, that is, positions, without taking into account the quality, especially the presence of an entry for a position. Using this purely quantitative indication may lead to a significant distortion or compression or to a significant skewing of the traffic information generated relative to the actual traffic situations. In contrast, in the inventive method, the deviation of entries is taken into account, and in particular is used as a reference point for generating a sub-vector. By splitting an individual vector with a qualitative indication of entries in the position table into sub-vectors, it is possible to minimize the distortion of the traffic information to be generated.

Preferably, the position at which a deviation between the versions of the position tables is detected determines the end of one sub-vector, which represents a part of the vector that provides the traffic information for a segment course. The position at which a deviation is present may determine the end of the sub-vector in that this position is used as the end position of the sub-vector. Alternatively, the position of the deviation may determine the end of the sub-vector to the effect that the end position of a sub-vector that begins at the position of the deviation is placed at the first position in the segment course at which, after the deviation, the positions in the two versions of the position table coincide again.

In accordance with one preferred embodiment, the inventive method therefore includes the step of determining an end position of a sub-vector of a vector that represents the traffic information from the currently used position table, the position of the at least one deviating entry being used as the end position of the sub-vector. In particular, when detecting the absence of an entry for a position in the version of the position table that is compared to the current position table, a vector that overall represents the traffic information is split up, that is, the sub-vector ends at the position that corresponds to the position at which there is no entry in the version of the position table that is to be compared. By dividing or splitting up the vector into sub-vectors, it is possible to reduce the skewing of the traffic information output using an older version of the position table. For instance, if congestion having a length that corresponds to the length of the segment section to the next position of the new version of the position table on the segment course is reported at a position that is included in both versions of the position tables, this would lead to a skewing of the traffic information when using the older version of the position table if this next position, at which the congestion ends, is not included in the older position table. In this case the transmission of the traffic information would lead to congestion being assumed from the last common position to the next position included in the older version. If a plurality of successive positions are missing along the segment course in the old version, this skewing is significant.

However, since in the preferred embodiment of the inventive method the sub-vector is terminated at the position at which the entry in the position table to be compared is missing, traffic data that are present for the subsequent sections may be processed corresponding to this distortion and the distortion may thus be minimized.

In accordance with one preferred embodiment, the method comprises the step of determining a start position of a sub-vector of a vector that represents the traffic information from the currently used position table, wherein when a deviation is detected at the position of the start position, the next position at which there is no deviation is used as end position of the sub-vector.

The next position along a segment course for which traffic information is to be rendered using the vector is again called the next position.

In that, with this embodiment of the inventive method, during the determination of the start position of a sub-vector especially the absence of an entry at this table location is detected, it is obvious that the following traffic data must be left open in order to be able to prevent further skewing of the traffic information. However, traffic information that relates to positions that are again present in the further position table must be reliably taken into account. In that the sub-vector, which begins at a position for which there is no entry in the position table to be compared, is limited to the length at the end of which there is again a common entry for the two position tables, that is, agreement, the information to be omitted for comparing the skewing is minimized. On the side of the system at which an older version of the position table is used, for instance in the vehicle, the traffic information included in this sub-vector is ignored or dropped. A special identifier for the sub-vector is not necessary here, since the part of the system that works with the older version of the position table does not find the start position of the sub-vector in the position table and therefore cannot further process these data.

In accordance with one embodiment, the traffic information is generated in a central device and the generated traffic information in the form of at least one sub-vector is transmitted from the central device to at least one vehicle. The central device is also called the backend. Provided in the vehicle to which the generated traffic information is transmitted is a device that further processes and outputs the traffic information. This device is in particular the vehicle-side device or the vehicle-side equipment of a navigation system. The device may represent a unit connected to the vehicle or may be added to the vehicle as a separate device. In the vehicle, the received traffic information is transmitted at the device using a position table available in the vehicle, that is, traffic data that were transmitted from the central device for this position or this segment are allocated to the positions included in the position table and to segments between the positions.

Preferably, the position table that is used in the inventive method represents a TMC (traffic message channel) location table. The vector that reflects the traffic information and especially includes position details and traffic data preferably represents a TFP (traffic flow prediction) vector.

Since it is not possible to completely prevent a certain skewing or a distortion or compression of the traffic information, even with the preferred splitting up of a vector at locations at which a deviation between entries in different positions exists, in accordance with the invention when the displacement of at least one sub-vector of the vector that corresponds to the segment course is detected, a relative offset may be used, in particular a metric offset.

In accordance with another aspect, the invention relates to a system for generating traffic information for at least one vehicle. The system is characterized in that it comprises a central device and at least one device that is connected to the vehicle which are set up such that the inventive method may be performed.

The device that is connected to the vehicle may include a processor unit and/or an at least partly hard-wired circuit arrangement and may be securely connected to the vehicle or added to the vehicle. The central device represents the backend.

The inventive system is preferably a navigation system that, especially preferred, includes at least one central device and at least one device for at least one vehicle. The central device represents the backend of the navigation system.

Advantages and features that are described for the inventive method apply, if applicable, correspondingly to the inventive system and vice versa and may therefore be explained or mentioned only once.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is a schematic representation of steps in the generation and processing of traffic information in two vehicles having different versions of the position table in accordance with one embodiment of the invention;

FIG. 5 is a schematic representation of steps in the generation and processing of traffic information in two vehicles having different versions of the position table in accordance with one embodiment of the invention;

FIG. 6 is a schematic representation of steps in the generation and processing of traffic information in two vehicles having different versions of the position table in accordance with one embodiment of the invention;

FIG. 7 is a schematic representation of steps in the generation and processing of traffic information in two vehicles having different versions of the position table in accordance with one embodiment of the invention;

FIG. 8 is a schematic representation of steps in the generation and processing of traffic information in two vehicles having different versions of the position table in accordance with one embodiment of the invention;

FIG. 9 is a schematic representation of steps in the generation and processing of traffic information in two vehicles having different versions of the position table in accordance with one embodiment of the invention;

FIG. 10 is a schematic representation of steps in the generation and processing of traffic information in two vehicles having different versions of the position table in accordance with one embodiment of the invention.

DETAILED DESCRIPTION OF THE DRAWINGS

Figure 1:
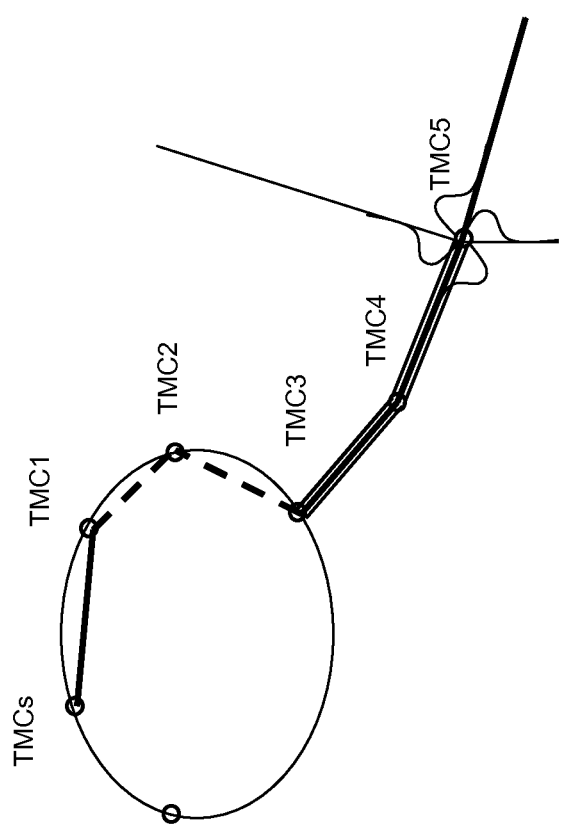
FIG. 1 is a schematic representation of traffic information on a map.

FIG. 1 is a schematic representation of generated traffic information on a street map along a segment course. In the depicted embodiment, the segment course begins at a position TMCs and ends at a position TMC5, which is at a highway interchange. "Free travel" is provided as traffic data in the segment section between TMCs and TMC1. "Slowed traffic" is indicated between the positions TMC1, TMC2, and TMC3. "Congestion" is given between the positions TMC3, TMC4, and TMC5. In all of the figures, a solid line indicates the traffic data "free," a broken line indicates "slowed traffic," and an enclosed line indicates "congestion" for corresponding segment sections. The segment sections are also called sections in the following.

Figure 2:
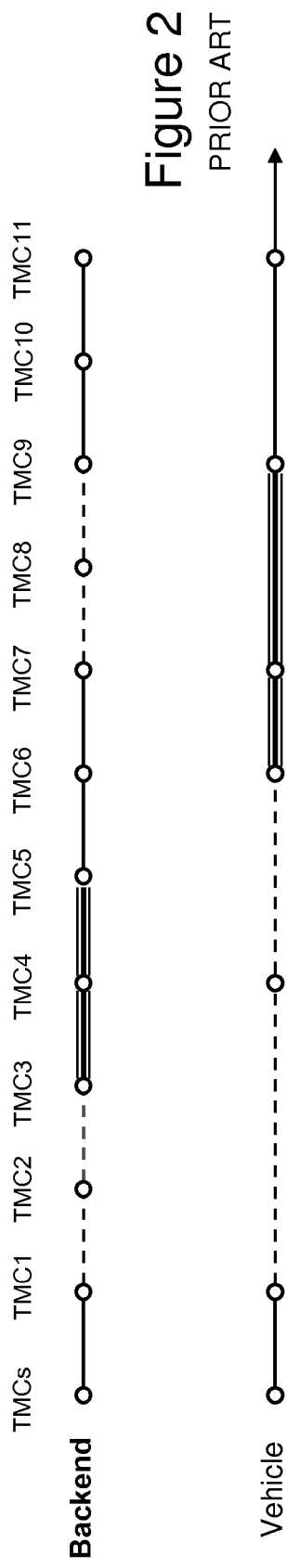
FIG. 2 is schematic traffic information at a central device having a new version of the position table and at a vehicle having an older version of the position table according to the prior art.

The top line of FIG. 2 schematically depicts traffic information in the form of a TFP vector having 12 sections and that may be transmitted from a backend to a vehicle. The TFP vector is determined by the provision of a start position TMCs and of the number of sections included in the vector that are formed by the distances between further positions TMC1-TMC11. Traffic data are given for each of the sections. For instance, the traffic data for the first section between TMCs and TMC1 is given as "free," for the second section between TMC1 and TMC2 it is given as "slowed traffic," and for the fourth section between TMC3 and TMC4 it is given as "congestion." The position data TMC1, TMC2, and so on are stored in a position table that is also called the TMC location table, that is, they represent entries in the position table. The entries may also be called positions, since they correspond to geographical locations or positions.

For the TFP vector depicted in FIG. 2, proceeding from one TMC location, 12 TMC locations are covered. In the lower line in FIG. 2, the traffic information like this is shown at a vehicle having an older position table, which is also called a TMC location table, based on the transmitted traffic information according to the prior art and would be output to the user.

In the older TMC location table there are no entries for a few positions in the TMC location table. For instance, no entries are included for TMC2 and TMC3 in the older TMC location table, that is, these positions are not included in the older version of the position table.

As may be seen from FIG. 2, given an older position table on the vehicle, the TFP vector is distorted downward and therefore incorrect data are output in the vehicle, especially in a vehicle-connected part of a navigation system in the vehicle. In particular slowed traffic would be indicated in the vehicle for the sections between TMC1 and TMC6, even though this traffic situation only exists in the sections TMC1 through TMC3.

Figure 3:
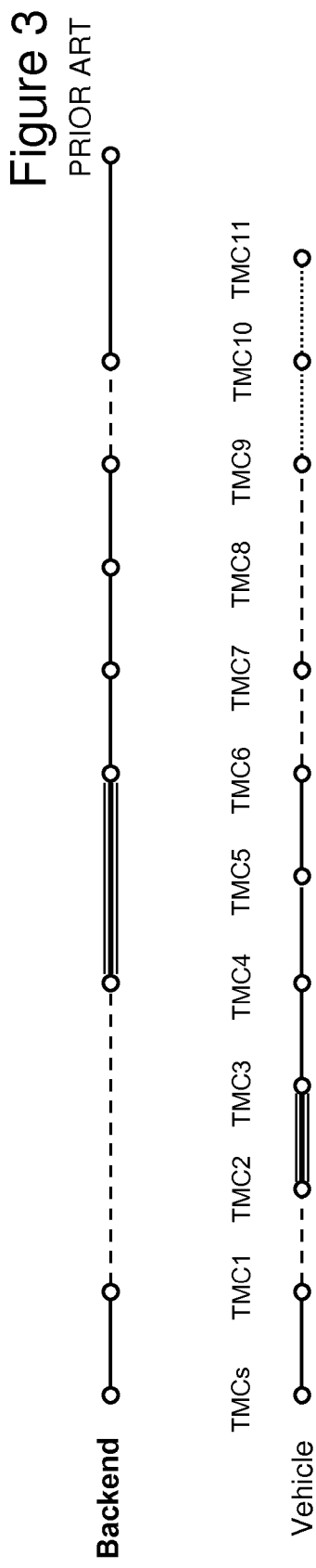
FIG. 3 is schematic traffic information at a central unit having an older version of the position table and at a vehicle having a newer version of the position table according to the prior art.

The reverse situation is depicted in FIG. 3, in which the version of the position table in the vehicle is newer than the position table in the backend. In this case, the TFP vector is compressed when it is obtained at the vehicle and thus it also does not correctly depict the actual position, either.

In accordance with the invention, preferably on the backend the oldest version of the position table that is to be supported by the currently used position table on the backend is determined. It may be Version 8, for instance, while Version 9, for instance, is used currently for generating the traffic data. The newer version is identified in the following and in the figures with vN and the older supported version is identified with vA. The present invention is not limited only to a jump from one version to the next. On the contrary, any number of versions may exist between the currently used version vN and the further older version vA.

As is shown in FIG. 2, in the newer position table vN 12 TMC locations for instance are covered by the TFP vector, while in the older position table vA only seven positions are entered for the same segment course.

In accordance with the present invention, the missing positions are faked or at least taken into account when the traffic information is generated. Relative addressing is used.

In accordance with the invention, the TFP vectors are split up for this at the positions that are not included in the older position table.

This is explained in greater detail in the following using FIGS. 4 through 10. At the backend it is detected that, after the start TMC location, the position TMC2 is not present in the older version. The TFP vector originally indicated with the start TMC location and the length of 12 TMC locations is therefore split up at position TMC2 of position table vN at the backend. The positions TMCs through TMC2, with the traffic data that are valid for the sections disposed therebetween, thus form a first sub-vector TV1. On the vehicle with the position table vA this leads to the first section (TMCs-TMC1) of the TFP vector being detected corresponding to the first part the position table vN on the backend. However, for the position table vA, the second part is significantly longer and corresponds to the length of TMC1 to TMC4 of the position table vN. For comparison, the transmission, as it is received at the vehicle with the new version vN, is given in the third column of FIGS. 4 through 10.

Since the position TMC3 is not included in the position table vA, either, in the next transmission the part between positions TMC2 and TMC3 and between the positions TMC3 and TMC4 is transmitted as the next sub-vector TV2. This is illustrated in FIG. 5. Since the position TMC4 is also included in the position table vA, the splitting up ends here. In other words, when the fact that the beginning of the sub-vector is disposed at a position that is not included in the older position table vA is detected, that is, it is at a position that represents a deviation between the versions, the end of the sub-vector is placed at the first position at which the versions are again in agreement. This means that the end of such a sub-vector is disposed at a position that is also included in the older version of the position table vA.

As may be seen from the second line in FIG. 5, the transmitted sub-vector TV2 is ignored or dropped on the vehicle having the position table vA. This may reduce the displacement or extension that was illustrated in FIG. 2. In contrast, the second sub-vector TV2 also corresponds to the sub-vector on the backend in the vehicle having the position table vN.

As FIG. 6 illustrates, the length of the next sub-vector TV3 is determined up to the position TMC5, since at this position there is again a deviation between the old and the new version. The position TMC5 is actually not present in the older version vA. Therefore, when the position table vA is used in the vehicle, the sub-vector TV3 is extended to the position that corresponds to the position TMC6 of the backend version.

The next sub-vector TV4 reaches from position TMC5 to position TMC6. The length of this sub-vector is determined in this manner since its start position is not included in the older version vA, that is, there is a deviation at this position. For such a sub-vector, the end of the sub-vector is defined at the position at which the first commonality of the two versions occurs again. The sub-vector TV4, which is depicted in FIG. 7, thus again represents a sub-vector that, since its start position is not included in the position table vA, is ignored or dropped on the vehicle with the position table vA. However, since the position TMC6 is again included in the position table vA, the sub-vector TV4 ends here.

As may be seen from FIG. 8, the next sub-vector TV5, which begins at the position TMC6, again includes two sections and reaches to position TMC8. The sub-vector TV5 is not interrupted at the position TMC7, since this sub-vector TV5 begins at a position that is also included in the position table vA and the position TMC7 is also included in the position table vA. Just the position TMC8 is missing in the position table vA so that the sub-vector TV5 ends there.

The next sub-vector TV6 illustrated in FIG. 9 begins at the position TMC8, which is missing in the position table vA. Therefore the sub-vector TV6 ends at the first position that is again included thereafter in the position table vA. This minimizes the skewing. The sub-vector TV6 is ignored or dropped in the vehicle with position table vA.

In the last sub-vector 7, which is illustrated in FIG. 10, the situation is as for the sub-vector TV7. This means that the latter begins at a position that is included in both versions of the position table vA and vN and ends at the first position at which a deviation between the versions of the position tables vA and vN occurs.

Thus in accordance with the inventive method, instead of a vector that covers 12 sections, a vector having seven sub-vectors is generated, four sub-vectors covering two sections and the sub-vectors each covering only one section.

Figure 11:
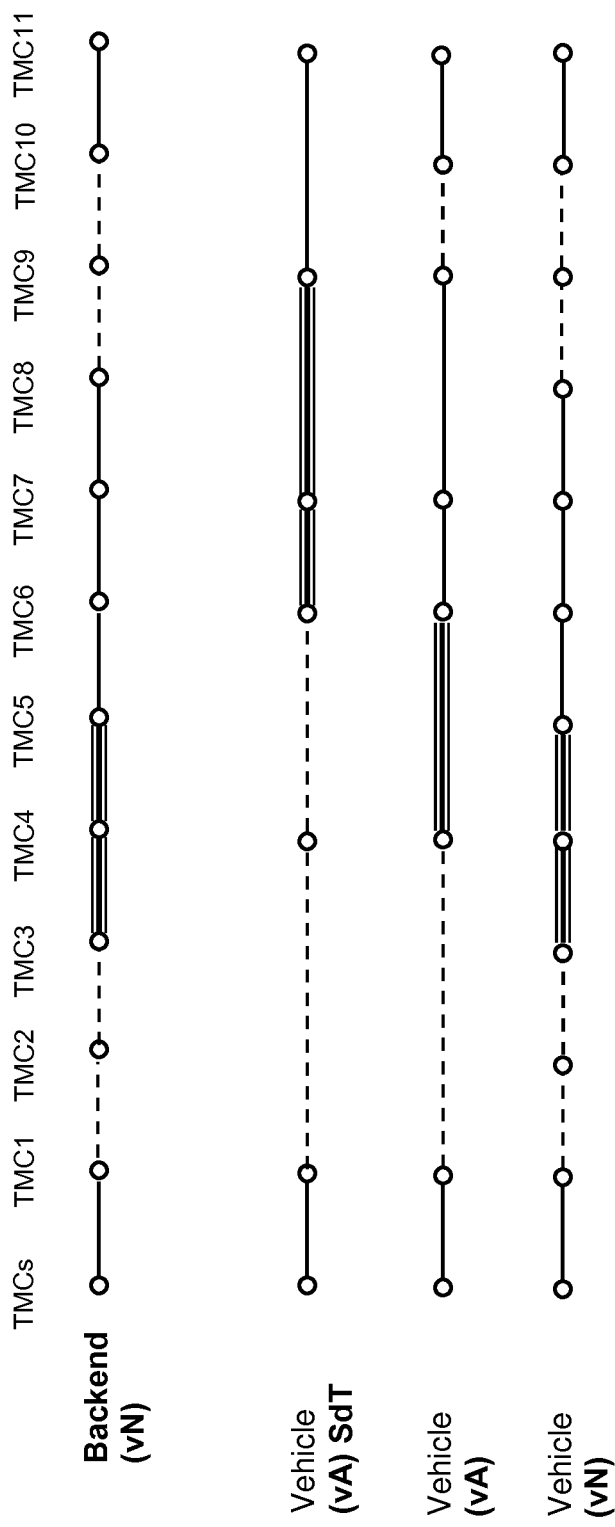
FIG. 11 is a schematic representation of traffic information at a central device having a new version of the position table and at two vehicles having older and newer versions, respectively, of the traffic information transmitted to the position table.

The result of the inventive generation of traffic information compared to the prior art is depicted schematically in FIG. 11. As may be seen from this comparison, the skewing in the inventive method is significantly less than with a method in accordance with the prior art (SdT). Specifically, in the inventive method the traffic information is output inaccurately in the vehicle having an older version of the position table only for sections TMC3 through TMC4 and TMC8 through TMC9.

The invention is not limited to the depicted embodiments.

The invention may be summarized as follows. For the correct handling of traffic information, preferably an "oldest" map version is defined, and thus so is the position table, associated with the map version, that is to be supported. For instance, at the start of RTTI the map version may be used for the oldest map version. RTTI is the abbreviation for Runtime Type Information.

The intent of the invention is to split up TFP vectors at positions, especially TMC locations, that are not present in the "oldest" location table. Any inaccuracies may be captured using relative offsets.

A number of advantages may be attained with the present invention. In particular, traffic information may be correctly displayed for maps having location tables that are newer than the "oldest" supported location table. The data may be attained without adapting the device in the vehicle, which device may also be called the head unit. Neither the hardware nor the software needs to be adapted, since only manner in which the traffic information is generated at the backend and transmitted to the vehicle must be adapted. The present invention is therefore very generic.

REFERENCE LIST

TMCs Start point for traffic management location
TMC1 Position (Traffic Management Location
TMC2 Position (Traffic Management Location
TMC3 Position (Traffic Management Location
TMC4 Position (Traffic Management Location
TMC5 Position (Traffic Management Location
TMC6 Position (Traffic Management Location
TMC7 Position (Traffic Management Location
TMC8 Position (Traffic Management Location
TMC9 Position (Traffic Management Location
TMC10 Position (Traffic Management Location
TMC11 Position (Traffic Management Location
TV1 Sub-vector
TV2 Sub-vector
TV3 Sub-vector
TV4 Sub-vector
TV5 Sub-vector
TV6 Sub-vector
TV7 Sub-vector The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating traffic information for at least one vehicle, said traffic information comprising at least one position, wherein the method comprises the acts of:
   comparing, by a central device, a current position table to a prior position table, each position table listing respective position entries;

determining, via the comparison, a deviating entry from among the listed position entries of the respective position tables;

generating, by the central device, a traffic information vector using the position of the deviating entry as a reference point for generating the traffic information vector;

transmitting the traffic information vector from the central device to a navigation device of the at least one vehicle;

generating, by the navigation device, traffic information based on the traffic information vector and the at least one prior position table stored by the navigation device; and displaying, by the navigation device, the traffic information in connection with a map comprising geographic positions corresponding to the position entries of the prior position table.

2. The method in accordance with claim 1, wherein the deviating entry represents an absent position entry in the prior position table or an additional position entry in the prior position table.

3. The method in accordance with claim 2, wherein the position of the deviating entry is used as a reference point for generating a sub-vector of the traffic information vector.

4. The method in accordance with claim 1, wherein the position of the deviating entry is used as a reference point for generating a sub-vector of the traffic information vector.

5. The method in accordance with claim 3, wherein the method further comprises act of: determining an end position of the sub-vector as the position of the deviating entry.

6. The method in accordance with claim 1, wherein the method further comprises act of: determining an end position of the sub-vector as the position of the deviating entry.

7. The method in accordance with claim 5, wherein the method further comprises the act of: determining a start position of the sub-vector, wherein when the position of the deviating entry is at the start position, the next position at which there is no deviation is used as the end position of the sub-vector.

8. The method in accordance with claim 1, wherein the method further comprises the act of: determining a start position of the sub-vector, wherein when the position of the deviating entry is at the start position, the next position at which there is no deviation is used as the end position of the sub-vector.

9. The method in accordance with claim 7, wherein the position table is a TMC location table and/or the vector represents a TFP vector.

10. The method in accordance with claim 1, wherein the position table is a TMC location table and/or the vector represents a TFP vector.

11. The method in accordance with claim 9, wherein when a displacement of at least one sub-vector of the vector is detected, a relative offset is used.

12. The method in accordance with claim 11, wherein the relative offset is a metric offset.

13. The method in accordance with claim 1, wherein when a displacement of at least one sub-vector of the vector is detected, a relative offset is used.

14. A system for generating traffic information for at least one vehicle, comprising:
an off-vehicle central device configured to:
compare a current position table to at least one further position table, each position table listing respective position entries;
determine, via the comparison, a deviating entry from among the listed position entries of the respective position tables; and
generate a traffic information vector using the position of the deviating entry as a reference point for generating the traffic information vector;
transmit the traffic information vector; and
an on-vehicle navigation device configured to:
receive the traffic information vector transmitted by the off-vehicle central device;
generate traffic information based on the received traffic information vector and the at least one prior position table stored by the navigation device; and
display the traffic information in connection with a map comprising geographic positions corresponding to the position entries of the prior position table.

15. The system in accordance with claim 14, wherein said system is a navigation system having a backend as the central device.

* * * * *